Dec. 9, 1958 A. THOMAS ET AL 2,864,012
MEANS FOR GENERATING ELECTRICAL ENERGY
FROM A RADIOACTIVE SOURCE
Filed Oct. 12, 1953 2 Sheets-Sheet 1
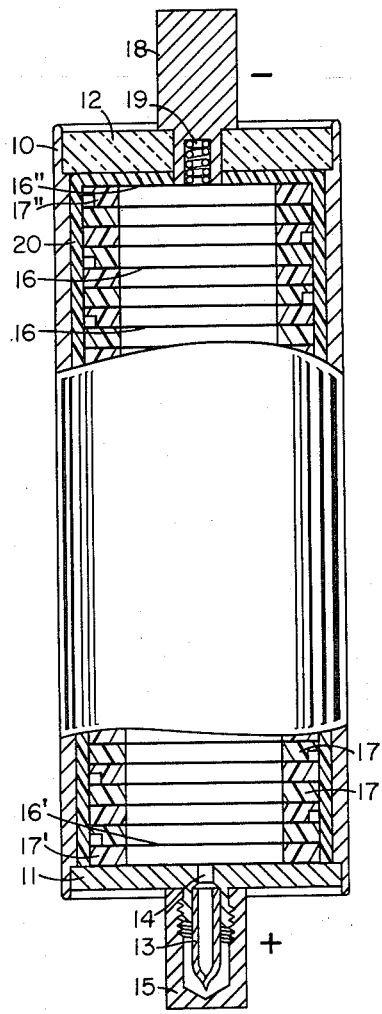
FIG. I
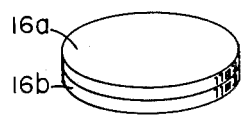
FIG. Ia
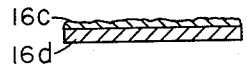
FIG. Ib
INVENTORS:
ALEXANDER THOMAS
ROGER SWEETSER
BY:
ATTORNEY Dec. 9, 1958  A. THOMAS ET AL  2,864,012
MEANS FOR GENERATING ELECTRICAL ENERGY
FROM A RADIOACTIVE SOURCE
Filed Oct. 12, 1953  2 Sheets—Sheet 2

INVENTORS:
ALEXANDER THOMAS
ROGER SWEETSER
BY:
*Spencer E. Olson*
ATTORNEY

United States Patent Office 2,864,012
Patented Dec. 9, 1958

2,864,012

MEANS FOR GENERATING ELECTRICAL ENERGY FROM A RADIOACTIVE SOURCE

Alexander Thomas, Weston, and Roger Sweetser, South Acton, Mass., assignors to Tracerlab, Inc., Boston, Mass., a corporation of Massachusetts Application October 12, 1953, Serial No. 385,612

7 Claims. (Cl. 310—3)

This invention relates generally to the generation of electrical energy and more particularly to unique means for deriving and utilizing the electrical energy of nuclear reactions.

The large magnitudes of energy provided by certain nuclear reactions of some radioactive substances and the increasing availability of low cost radioisotopes provide a promising field for the development of new sources of electrical energy. Since the irradiation attendant radioactive disintegrations is largely electrical in nature, it is desirable that such electrical energy be converted directly to electrical energy of useable form. The direct utilization of such energy provides more convenient utilization than previously proposed systems wherein the nuclear energy is converted to heat which in turn is converted to mechanical energy and the mechanical energy then converted to electrical energy in a usable form.

The present invention contemplates the conversion of alpha or beta ray energy to electrical energy by ionization of a gas and collection of the ionization current by the field produced by the contact potential difference (hereinafter referred to as C. P. D.) between two dissimilar metals thereby to provide a low current source of electrical power.

The primary object of the invention is to provide improved means for generating electrical energy in response to nuclear energy.

Another object of the invention is to provide improved means for utilizing the electrical energy in nuclear reactions to produce low current sources of electrical power.

A more specific object of the invention is to provide a battery for yielding electrical energy in commercially usable form utilizing the energy of the nuclear disintegration process.

A further object of the invention is to provide a battery yielding power by a nuclear disintegration process which is small in size and weight and which has a shelf life superior to conventional electrolytic cells.

Another object of the invention is to provide a battery utilizing the energy of nuclear disintegration and the contact potential difference of dissimilar metals to provide electrical power in commercially usable form.

Another object of the invention is to provide a battery utilizing a nuclear disintegration process which is not hazardous to the health of personnel using the battery.

In the attainment of the foregoing objects, the present invention contemplates a battery for converting the energy of nuclear radiation into electrical power, and briefly, comprises a casing in which are stacked a plurality of spaced bi-metallic electrodes, one of the metals of which has a high work function and the other of which has a low work function. The electrodes are supported within a common volume of an ionizable gas, and a beta-emitting radioisotope is contained within the casing and arranged uniformly to ionize the gas in the spaces between adjacent electrodes. In a preferred embodiment the isotope is in gaseous form and mixed with the ionizable gas. The ions formed in the gas under the influence of the radiation are collected by the field produced by the contact potential difference of the high and low work function metals. Output terminals are connected to the high work function metal of the electrode at one end of the stack and to the low work function metal of the electrode at the other end of the stack, respectively, the open-circuit potential of the battery being substantially the product of the contact potential difference of the metals used multiplied by the number of electrodes in the stack.

Other objects, features and advantages of the invention will become apparent from the following discussion and detailed description of a preferred embodiment of the invention considered with the accompanying drawings of which:

Fig. 1 is an elevation cross section of a battery constructed in accordance with the present invention;

Figs. 1a and 1b are perspective and cross section views, respectively, of two forms of the electrodes of the battery.

Figure 2:
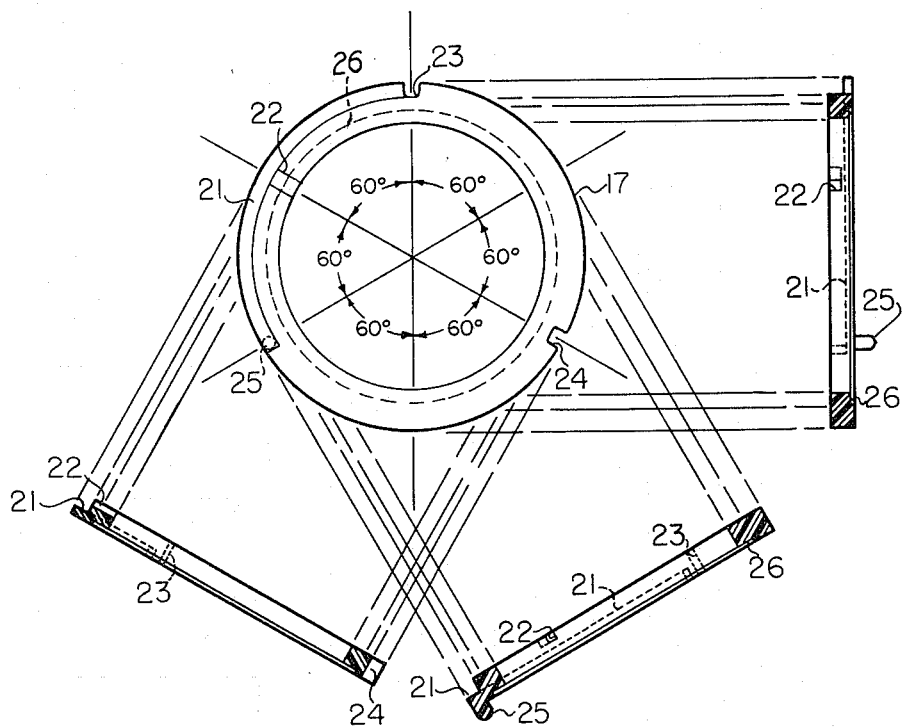
Fig. 2 is a drawing partly in plan, and partly in elevation cross section, illustrating the construction of the spacing insulators between the electrodes of the battery.

The basis for the present invention resides in ionizing a gas by alpha or beta ray energy and collecting the ionization current by the field produced between two dissimilar metals. The E. M. F. of a single cell, i. e., two separated electrodes of dissimilar metal with an ionizable gas therebetween, is numerically equal to the contact potential difference, which in turn, is the difference in the work functions of the metals which compose the electrodes. The situation is analogous to the action of a voltaic cell, where the E. M. F. of the circuit equals the chemical E. M. F. of the cell, i. e., the open circuit potential difference. One difference in the nuclear cell is that although the contact potential difference itself cannot generate an E. M. F., the process of overcoming this contact potential difference by gaseous ionization at the electrodes delivers this contact potential difference as an E. M. F. to the circuit. A second difference is that in a nuclear cell no permanent change takes place in the constituents (gas and electrodes) and the current flows as long as radiation is present to ionize the gas. Other factors being constant, the function of the radiation, in effect, is that of determining the internal resistance of the nuclear cell.

Continuous current flows through a nuclear cell provided the following conditions are present: (1) charge is permitted to flow through an external circuit; (2) ionization is maintained; (3) the ionization potential of the gas is higher than the work function of the higher work function electrode; and (4) the work function of the electrode materials does not deteriorate. Thus, a battery comprising a single cell delivers a small current at a relatively low voltage and has an internal resistance dependent only on the level of radiation used to ionize the gas in the gap between electrodes. Most battery applications, however, require a larger output voltage than is possible with such a single cell, and applicants have found that the voltage may be increased by stacking a number of cells in series, the total voltage being equal to the sum of the contact potential difference of the individual cells.

Since size and weight of the finished battery is important, and inasmuch as a relatively large number of cells are necessary to provide a usable voltage, the problem of ionizing the gap, which is necessarily of a small dimension, is an important consideration in the physical design of a battery. The number of available isotopes having suitable radiation characteristics is rather limited, either by reason of being dangerous to personnel, or as being of too short life to be useful in a battery where long life is desired. Of a number of isotopes investigated, tritium appears to be the best, having the following desirable characteristics:

(1) Reasonably long half-life (12.4 years).
(2) Short range beta particle (.5 cm. at NTP in air).
(3) No shielding problem (maximum energy of β particle=18 k. e. v., no γ radiation).
(4) Available in large quantities at a reasonable cost.
(5) Usable in gaseous form, minimizing geometry losses.

The low energy β particle emitted by tritium not only makes the secondary electromagnetic radiation negligible, thereby making extra shielding unnecessary, but also keeps the path lengths of gaseous ionization short, so that the cells can be made very compact. For example, if the ionizable gas in the gap between the dissimilar metal electrodes is argon at two atmospheres pressure, the range of the particle is less than 2 mm. If, by proper selection of electrode materials, each cell can deliver 2 volts, 30 cells will deliver 60 volts in a total gas "thickness" of 6 cm. or a little over two inches.

Consider now the factors affecting the practical design of a nuclear battery of reasonable size and voltage. Since the field which collects the ions is produced by the inherently low contact potential, and since the highest collection efficiency for a given ion chamber voltage is secured with parallel plate geometry, the battery generally comprises a stack of plane electrode pairs in contact and between which gaseous ionization gaps containing radioactive gas are provided by means of insulating separators. To achieve a stable battery with optimum voltage output utilizing the foregoing general construction, a number of problems must be overcome:

(1) There must be no direct gaseous leakage path from any cell to ground.
(2) Means must be provided to fill each cell equally with ionizable and radioactive gas.
(3) There must be a minimum gaseous electrical leakage through the openings provided for accomplishing item 2.
(4) There must be a minimum opportunity for gaseous electrical leakage around any path from one side of the electrode pair to the other.
(5) To minimize the cost of radioactive gas, the "dead" gaseous volume, i. e. that volume not enclosed by the electrodes, should be minimized.

The foregoing problems are satisfactorily solved by the construction illustrated in Figs. 1, 1a, 1b and 2. Referring first to Fig. 1, the battery has an outer cylindrical shell 10, preferably formed of stainless steel because of its non-corrosive properties, closed at one end by a stainless steel plate 11, and at the other by a disc 12 of insulating material. Disc 12 may be formed of glass, or of a ceramic insulating material such as "Alsimag" which permits a vitreous seal to the stainless steel casing. An exhaust tube 13, preferably formed of oxygen-free soft copper is soldered to plate 11 and communicates with the interior of the cell through opening 14. Exhaust tubing 13 may be pinched off and soft-soldered after filling the battery with the radioactive gas mixture. The tubing 13 is protected by a threaded cap 15, also preferably formed of stainless steel, which acts as one terminal of the battery.

Stacked inside the casing 10 are a plurality of electrode pairs 16 separated from each other by insulating separators 17, preferably formed of a plastic such as polystyrene or other insulating material. In Fig. 1, each of the electrode pairs is shown by a single line, but actually each comprises a very thin bi-metallic disc formed of materials having a suitable difference in work function to provide an appreciable voltage per cell. Thus, each electrode pair 16 may comprise two extremely thin discs, as illustrated in Fig. 1a, one 16a of aluminum and the other 16b of platinum, for example, in intimate mechanical contact. In the interest of saving space, each disc may be of the order of .0025 inch thickness, making each pair 16 of a thickness of .005 inch. The handling problem introduced by such thin discs, however, and the cost of the platinum, makes it more desirable to fabricate each pair as a composite unit; this is accomplished by sputtering platinum 16c on an aluminum disc 16d (Fig. 1b) of proper area and thickness to an extent such that the overall thickness is of the order of .005 inch.

It will of course be understood that while aluminum and platinum have been described as suitable dissimilar metals to obtain a reasonable C. P. D., other combinations of elements having suitable mechanical characteristics for fabrication and exhibiting a relatively large C. P. D. may be used in the construction of the electrode pair 16 without departing from the spirit of the invention. Examples of high work function surfaces are carbon, chromium, nickel, arsenic, selenium, molybdenum, palladium, tungsten, iridium or oxides of these elements. Examples of low work function metals are lithium, beryllium, magnesium, calcium, barium, and zinc.

Depending on the E. M. F. of each cell, a number of electrode pairs sufficient to give the desired battery voltage are stacked as shown. The first plate 16', at the bottom of the battery, is separated from end plate 11 by an insulating spacer 17', and is disposed with the higher work function metal (e. g. platinum) directed upward. All of the electrode pairs are similarly disposed with the last plate 16" resting on insulating spacer 17", whereby the upper surface of the last electrode pair is the higher work function metal. The other electrical terminal 18 of the battery, also preferably formed of stainless steel, projects through insulator 12, making contact with the upper surface of electrode pair 16" by means of a light compression spring 19. The upper surface of electrode 16" is not in a position to collect ions, however, and accordingly the lower surface (e. g. aluminum) is the effective end material. Thus, terminal 18, connected to the low work function material of the electrode, becomes the negative terminal of the battery, since the internal positive ion flow is from the low work function material to the high work function material due to the direction of contact potential field established between the two surfaces. Terminal 15 is effectively connected to the high work function material of the lower cell and forms the positive terminal of the battery. It will be understood that reversal of the disposition of the electrode pairs reverses the terminal voltage of the battery.

The stack of cells is separated from the metal shell 10 by a liner 20 formed of glass or a plastic, "Teflon" or polystyrene being suitable because of their good insulating properties and ready machinability. The battery, when in use, normally has the shell 10 grounded to reduce strong electrostatic effects, and the liner 20 thus eliminates gaseous leakage paths to ground from the cells.

The remaining four problems listed above are overcome by the design of the electrode spacers 17, the construction of which will now be described with reference to Fig. 2. Referring to the drawing, which is greatly enlarged, each spacer consists of a substantially flat annular ring 17 having a peripheral arcuate channel 21 for 120° of arc, the channel being of a height equal to about one-half the thickness of the ring. At the center of channel 21 a surface slot 22 connects the channel with the interior of the ring. At one end of channel 21 an edge slot 23 extends completely through the ring, and 120° clockwise therefrom another edge slot 24 extends through the ring. Opposite the other end of arcuate channel 21 a pin 25 projects below the spacer for keying the spacer to the next adjacent spacer of the assembled battery in a manner to be later described. The ring also has a shallow groove 26 at its inner diameter and on the surface opposite from channel 21 to accommodate an electrode pair 16 constructed as aforesaid. In the interest of reducing battery size and to achieve an optimum spacing between electrodes to efficiently use the energy of the beta radiation from the tritium, the spacer is quite small in size and is preferably injection molded of polystyrene or similar resinous material. To give an appreciation of the dimensions of spacer 17 as employed in a battery constructed in accordance with the present design, the outer diameter of the ring is .680 in., the inner diameter is .525 in., the thickness is .045 in., slots 23 and 24 are each .032 in. wide and channel 21 has a cross-section of .032 in. x .030 in.

In assembling the battery, starting with the first spacer oriented as shown, the second spacer, with an electrode pair 16 previously inserted in groove 26, is placed on top the first spacer with pin 25 inserted in edge slot 24. Thus slot 23 of the second spacer is opposite pin 25 of the first spacer, and communicates with that end of channel 21. The third spacer, with electrodes 16 inserted, is oriented with pin 25 in slot 24 of the second spacer with the result that channel 21 of the third spacer is disposed above the arcuate region between slots 24 and 25, as shown in Fig. 9. The fourth spacer of the assembly, by virtue of the 120° rotation between successive spacers, has the same orientation as the first spacer. Thus, as gas is pumped into the battery (Fig. 1), the gas flows out through surface slot 22 of the first spacer 17′, around channel 21, and thence upward through edge slot 23 of the second spacer, around channel 21 of the second spacer, into the space between the first and second electrode pairs through surface slot 22 of the second spacer, and so on. That is, the gas follows a tortuous path spirally through the stack of spacers, and the axial slots are so arranged that there is no direct electrical leakage between cells. While some electrical leakage may be expected through the channels 21, i. e., from slot 23 (communicating with one cell) halfway around channel 21 to surface slot 22 (communicating with an adjacent cell), it is so small as to be negligible. In a spacer having the dimensions listed above, one-half of channel 21 is .817 cm. long and the channel cross-section is $.032 \times .030 \times 2.54^2 = .00619$ cm.$^2$. Assuming a maximum current per cell to be $1.185 \times 10^{-9}$ amperes for one millicurie of tritium per cell, the maximum leakage current should not be greater than the combined product of the ratio of the leakage cross section to the active plate electrode area and the ratio of the plate separation to the leakage distance and the current per cell. Since the separation between electrode pairs 16 in the present design is .1016 cm. and the active area of the electrodes is 1.393 cm.$^2$, the maximum leakage current $I_l$ in terms of cell current $I_c$ is:

$$I_l = \frac{.00619}{1.393} \times \frac{.1016}{.817} \times 1.185 \times 10^{-9} = 6.53 \times 10^{-13} \text{ amp.}$$

This is about ⅕ of the leakage current to be expected through a good .05 mfd. polystyrene storage capacitor placed externally across a battery delivering 60 volts, and may be considered entirely negligible.

After assembly of the battery, as shown in Fig. 1, air is removed by connecting a vacuum pump to exhaust tube 13. After evacuation, the battery is filled with tritium gas diluted with hydrogen to prevent "getting" of the tritium by the insulators and metals of the battery, and argon to provide a medium for gaseous ionization to take place. The tritium and hydrogen mixture may be introduced first, and then the argon, with mixing being accomplished by diffusion, or alternatively, the tritium, hydrogen and argon may be pre-mixed prior to filling. The battery is preferably filled to a total pressure in the range of two to four atmospheres, the pressure being chosen to insure that the spacing between electrodes corresponds to greater than one mean free path of tritium beta particles in the gaseous medium. While argon has been described as the ionization medium, it will be understood that other gases compatible with the metals used as the electrodes, and having a suitable density, and relatively low recombination, may also be used. Other examples of suitable gases are krypton, xenon, nitrogen, ethane, propane, and isobutane.

Throughout the foregoing discussion, the source of radioactivity has been described as tritium in gaseous form intimately mixed with the ionizable gas, to facilitate handling of the activity and fabrication of the battery. It is possible, however, and in certain cases it may be preferable to utilize the tritium in other forms. For example, the tritium may be adsorbed on one of the materials constituting the electrodes; in this case, the tritium may be adsorbed on one of the electrode materials prior to assembly, and the battery simply filled with a suitable ionizable gas. The radiation from the adsorbed tritium has sufficient range to ionize the gas, and has the advantage that tritium is located so as to make efficient use of the radiation therefrom, thus eliminating the loss of activity in "dead spaces" as is the case when the tritium is mixed with the ionizable gas. The operation of the battery is otherwise as described above.

As another alternative, the tritium may form a part of a chemical compound, with the compound employed as one of the electrode materials. It has been found that stearic acid can be readily compounded in which a part of the hydrogen is the isotope of atomic weight 3. Certain stearates compounded from radioactive stearic acid are manifestly suited for one of the materials of the electrode as well as the source of radioactivity. For example, calcium stearate, normally a solid insulator, may be applied as a coating on another material to form an electrode. Calcium stearate has a high work function, which is unaffected by the presence of the tritium, and the ionization thereof by the beta radiation from the tritium renders it conductive, a requirement, as noted above, for ion collection to take place. In addition to ionizing the stearate itself, beta radiation from the tritium ionizes the gas in the spaces between the electrodes, and ion collection occurs as previously described. Thus, the electrodes may be formed of a plate of suitable low function material coated with a layer of a tritiated stearate prior to assembly, consequently requiring filling only with an ionizable gas. Other tritiated stearates are also suitable, and it is to be understood that other compounds, having tritium chemically incorporated therein and possessing a suitable work function, may likewise be used. Accordingly, it is intended that tritiated calcium stearate should be considered as illustrative only and not in a limiting sense.

From the foregoing it is seen that there is provided a battery in which ionization produced by the radiation from tritium is collected by the field produced by the contact potential difference of dissimilar metals. The E. M. F. per cell is limited by the C. P. D. between the electrode materials, but any desired voltage may be obtained by stacking a plurality of cells, as above described. While a particular insulating spacer has been described to permit filling of the battery while limiting electrical leakage between cells to an unobjectionable minimum, it will be understood that modification thereof will be apparent without departing from the scope of the invention. For example, two keying pins may be used to facilitate assembly, or the several notches and channels may be modified to facilitate molding and assembly. Likewise, the electrode material may comprise a variety of combinations of materials so long as the basic requirement of an appreciable difference in work functions is met. It is the intention, therefore, that the foregoing description of a specific embodiment be considered as illustrative only and not in a limiting sense, and that the invention be limited only by the appended claims.

What is claimed is:

1. Apparatus for primarily generating electrical energy comprising a plurality of spaced, parallel, planar electrodes each constituted by two contacting materials having appreciably different work functions, a like plurality of annular insulating spacers separating said electrodes, means including said spacers confining an ionizable gas in the spaces between said electrodes whereby said gas is in contact with said electrodes, and a source of beta radiation consisting of tritium disposed in each of the spaces between electrodes, the spacing between said electrodes and the disposition of said tritium being such that substantially all of the energy of the beta radiation from the tritium is expended in ionizing said gas.

2. Apparatus for primarily generating electrical energy comprising a plurality of spaced, parallel, planar electrodes each constituted by two contacting materials having appreciably different work functions, means confining an ionizable gas in the spaces between said electrodes, and a radioactive gas mixed with said ionizable gas.

3. Apparatus for primarily generating electrical energy comprising a plurality of spaced electrodes each consisting of two dissimilar materials, one having a high work function and the other a low work function, a like plurality of annular insulating spacers separating said electrodes, a mixture of an ionizable gas and a radioactive gas enclosed in the spaces between said electrodes, and two terminals one being connected to the high work function material of one of said plurality of electrodes and the other being connected to the low work function material of another of said plurality of electrodes.

4. A nuclear battery comprising a stack of planar spaced electrodes each consisting of two dissimilar materials, one having a high work function and the other a low work function, a mixture of an ionizable gas and a radioactive gas in the spaces between said electrodes, and a like plurality of annular insulating spacers disposed between said electrodes constructed and arranged to permit the flow of gas from one space to the next while limiting gaseous electrical leakage from one side of an electrode to the other.

5. Apparatus in accordance with claim 4 wherein said radioactive gas is tritium and the spacing between said electrodes is substantially equal to the range of tritium beta particles in said ionizable gas.

6. A nuclear battery comprising a cylindrical metallic casing, an insulating liner for said casing, a plurality of spaced bimetallic electrodes stacked within said liner, one of the metals of said electrode having a high work function and the other having a low work function, an ionizable gas having an ionization potential higher than the work function of said high work function metal and an electron affinity lower than the work function of said low work function metal enclosed in the spaces between said electrodes, means for ionizing said ionizable gas comprising tritium gas mixed therewith, the ions thus formed being collected by the field produced by the contact potential difference of said high and low work function metals, a plurality of insulating spacers separating said electrodes, and first and second terminals respectively connected to the higher work function metal of the electrode at one end of the stack and to the lower work function metal of the electrode at the other end of the stack.

7. A nuclear battery comprising, a cylindrical metallic casing, an insulating liner for said casing, a plurality of spaced electrodes each formed of a high work function material and a low work function material in intimate contact stacked within said liner with the high work function material of one electrode opposing the low work function material of the next adjacent electrode, a mixture of an ionizable gas and tritium gas in the spaces between said electrodes, a plurality of annular insulating spacers disposed between said electrodes and insulating the peripheries of said electrodes to minimize gaseous electrical leakage from one side of the electrode to the other, the thickness of said spacers being substantially equal to the range of tritium beta particles in said ionizable gas, and first and second terminals respectively connected to the high work function material of the electrode at one end of the stack and to the low work function material of the electrode at the other end of the stack.

References Cited in the file of this patent

UNITED STATES PATENTS

| 2,493,935 | Wiegand et al. | Jan. 10, 1950 |
| 2,631,246 | Christian | Mar. 10, 1953 |
| 2,661,431 | Linder | Dec. 1, 1953 |
| 2,696,564 | Ohmart | Dec. 7, 1954 |

OTHER REFERENCES

A New Electronic Battery, in The Electrician, vol. 10, page 497, published October 31, 1924.